United States Patent
Deshpande et al.

(10) Patent No.: US 9,926,912 B2
(45) Date of Patent: Mar. 27, 2018

(54) SYSTEM AND METHOD FOR ESTIMATING WIND COHERENCE AND CONTROLLING WIND TURBINE BASED ON SAME

(71) Applicant: General Electric Company, Schenectady, NY (US)

(72) Inventors: Ameet Shridhar Deshpande, Schenectady, NY (US); Timothy J. McCoy, Seattle, WA (US); Sandeep Gupta, Stanford, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/251,515

(22) Filed: Aug. 30, 2016

(65) Prior Publication Data

US 2018/0058425 A1  Mar. 1, 2018

(51) Int. Cl.
F03D 11/00 (2006.01)
F03D 9/00 (2016.01)
H02P 9/00 (2006.01)
F03D 7/04 (2006.01)
(Continued)

(52) U.S. Cl.
CPC ........... F03D 7/046 (2013.01); F03D 7/0224 (2013.01); F03D 7/0248 (2013.01); F03D 7/048 (2013.01); F03D 9/005 (2013.01); F03D 9/25 (2016.05)

(58) Field of Classification Search
CPC ...... F03D 7/046; F03D 7/0248; F03D 7/0224; F03D 7/048; F03D 9/25
See application file for complete search history.

(56) References Cited

U.S. PATENT DOCUMENTS 7,281,891 B2 * 10/2007 Smith ................... F03D 7/0224
290/55
7,342,323 B2   3/2008  Avagliano et al.
7,942,629 B2   5/2011  Shi et al.
(Continued)

FOREIGN PATENT DOCUMENTS

EP     2626551 A2    8/2013
WO  WO2011150942 A1  12/2011

OTHER PUBLICATIONS

"LIDAR Wind Speed Measurement Analysis and Feed-Forward Blade Pitch Control for Load Mitigation in Wind Turbines"; Oct. 2011; by Dunne et al.; pp. 1-53.*

(Continued)

*Primary Examiner* — Ramesh Patel
(74) *Attorney, Agent, or Firm* — Dority & Manning, P.A.

(57) ABSTRACT

The present disclosure is directed to a system and method for estimating an overall wind coherence acting on a wind turbine and using same to dynamically adapt the gain or bandwidth of pitch or torque or yaw control logic within a wind turbine. The method includes generating, via sensors, a plurality of sensor signals reflective of wind conditions near the wind turbine. The method also includes filtering, via at least one filter, the sensor signals at a predetermined frequency range considered damaging for turbine sub-system loading. Thus, the method also includes estimating an overall damaging wind coherence acting on the wind turbine as a function of distance-normalized wind coherences, which themselves are derived from auto and cross-covariances of pairs of filtered signals. The distance normalization uses a model of natural coherence dissipation with distance.

20 Claims, 5 Drawing Sheets

(51) Int. Cl.
*F03D 9/25* (2016.01)
*F03D 7/02* (2006.01)

(56) References Cited

U.S. PATENT DOCUMENTS

| | | | |
|---|---|---|---|
| 7,950,901 B2 | 5/2011 | Barbu et al. | |
| 8,025,476 B2 | 9/2011 | Zheng et al. | |
| 8,076,789 B2 | 12/2011 | Miller | |
| 8,390,791 B2 * | 3/2013 | Vert | G01S 7/4814 356/3.01 |
| 8,901,763 B2 | 12/2014 | Bowyer et al. | |
| 8,907,511 B2 | 12/2014 | Bowyer et al. | |
| 8,915,709 B2 | 12/2014 | Westergaard | |
| 8,928,164 B2 * | 1/2015 | Bowyer | F03D 7/0276 290/44 |
| 9,128,184 B1 * | 9/2015 | Bachmann | F03D 7/0268 |
| 9,217,415 B2 * | 12/2015 | Bowyer | F03D 7/042 |
| 9,441,610 B1 * | 9/2016 | Bachmann | F03D 7/0268 |
| 2007/0171396 A1 * | 7/2007 | Harris | G01S 17/95 356/28 |
| 2009/0047116 A1 * | 2/2009 | Barbu | F03D 7/0224 415/1 |
| 2010/0195089 A1 | 8/2010 | Wu et al. | |
| 2012/0056426 A1 | 3/2012 | Van Kuik et al. | |
| 2012/0134802 A1 | 5/2012 | Westergaard et al. | |
| 2012/0171036 A1 | 7/2012 | Westergaard | |
| 2012/0179376 A1 | 7/2012 | O'Brien et al. | |
| 2013/0062880 A1 * | 3/2013 | Bowyer | F03D 7/0276 290/44 |
| 2013/0094960 A1 * | 4/2013 | Bowyer | F03D 7/042 416/1 |
| 2013/0094961 A1 | 4/2013 | Couchman et al. | |
| 2013/0161956 A1 | 6/2013 | Evans | |
| 2013/0259686 A1 | 10/2013 | Blom et al. | |
| 2013/0297085 A1 | 11/2013 | Xiongzhe et al. | |
| 2014/0035285 A1 | 2/2014 | Creaby et al. | |
| 2014/0070538 A1 | 3/2014 | Bowyer et al. | |
| 2014/0125058 A1 | 5/2014 | Olesen | |
| 2014/0140843 A1 | 5/2014 | Spruce et al. | |
| 2014/0203563 A1 | 7/2014 | Bowyer et al. | |
| 2014/0217729 A1 | 8/2014 | Zaib et al. | |
| 2014/0232198 A1 | 8/2014 | Garcia et al. | |
| 2014/0334927 A1 | 11/2014 | Hammerum | |
| 2014/0339829 A1 | 11/2014 | Doan | |
| 2015/0056072 A1 | 2/2015 | Perley et al. | |
| 2015/0125297 A1 | 5/2015 | Bahuguni et al. | |
| 2015/0132128 A1 | 5/2015 | Zaib et al. | |
| 2015/0145253 A1 * | 5/2015 | Bayon | F03D 7/043 290/44 |
| 2015/0233349 A1 | 8/2015 | Pericleous | |

OTHER PUBLICATIONS

Analysis of Wind Speed Measurements using Continuous Wave LIDAR for Wind Turbine Control; Jan. 2011; by Simley et al.; pp. 1-16.*

Schlipf, David, Detection of Wind Evolution and Lidar Trajectory Optimization for Lidar-Assisted Wind Turbine Control, Gebruder Borntraeger Science Publishers, vol. 24, No. 6, Published Online Aug. 31, 2015, pp. 565-579.

* cited by examiner

SYSTEM AND METHOD FOR ESTIMATING WIND COHERENCE AND CONTROLLING WIND TURBINE BASED ON SAME

FIELD OF THE INVENTION

The present invention relates generally to wind turbines, and more particularly, to systems and methods for estimating wind coherence and controlling wind turbines based on said coherence so as to prevent damage caused by extreme loads.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known aerodynamic principles. The rotor blades transform the kinetic energy in the form of mechanical energy so as to turn a shaft coupling the rotor blades to a gearbox, or if a gearbox is not used, directly to the generator. The generator then converts the mechanical energy to electrical energy that may be deployed to a utility grid.

A plurality of wind turbines are commonly used in conjunction with one another to generate electricity and are commonly referred to as a "wind farm." Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm is commonly provided.

Traditionally, wind farms are controlled in a decentralized fashion to generate power such that each turbine is operated to maximize local energy output while also minimizing the impact of local fatigue and extreme loads. To this end, each turbine includes a control module, which typically attempts to maximize power output of the turbine in the face of varying wind and grid conditions, while satisfying constraints like sub-system ratings and component loads.

It is well known that large coherent structures in the wind cause extreme loads in wind turbines and determine the extreme design load envelope. The requirements for reacting to such coherent structures, which govern extreme loads acting on the wind turbine, are different than that for reacting to the normal turbulent wind, which govern fatigue loads. For example, when coherence is high, it is beneficial to have less smoothing in the wind estimation to preserve and respond to large and sharp wind gusts in full measure so as to reduce the extreme loads. On the other hand, during low wind coherence, less smoothing causes unnecessary pitch activity and fatigue, as the wind estimation responds to noise. Thus, to handle both extreme and fatigue loads, wind turbine controllers need to be able to detect large coherent structures in oncoming wind, as well as the ability to change the response strategy accordingly.

Coherence can be expressed at various time scales and can have different impact on turbine loading which may not be monotonic with the time scale of the transients. More specifically, coherence is usually high for slow wind transients, but does not pose a danger to turbine loads as they are easily rejected by the controller. For wind transients at medium timescales, coherence decreases but could pose increased risk to the turbine loading due to resonance with natural frequencies and the controller tuning. As very fast timescales, coherence would typically die down to not pose loading risk. Thus, understanding how the wind transients at various time-scales and coherence levels affect turbine component loading is essential in designing a metric of damaging or loads-relevant wind coherence.

Some conventional methods for estimating coherence for wind characterization utilize Fourier transforms to compute coherence spectra. Such methods, however, involve complex calculations at multiple discrete frequencies, averaging over large time intervals, and can be time-consuming to complete. Further, such methods are agnostic to the nature of wind transients that can worsen turbine loads. Therefore, such methods are typically incapable of providing quick detection of large coherent structures and subsequent control action thereof.

Accordingly, an improved system and method for estimating wind coherence and controlling wind turbines based on said coherence to prevent damage would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for estimating an overall or rotor-wide (i.e. loads-relevant) wind coherence acting on a wind turbine. The method includes generating, via a plurality of sensors, a plurality of sensor signals reflective of wind conditions near the wind turbine. The method also includes filtering, via at least one shaping filter, the sensor signals at a predetermined frequency range considered damaging for turbine sub-system loading. Further, the method includes determining a distance-normalized covariance of each pair of the filtered sensor signals to capture the size of damaging wind variations as well as their correlation. Moreover, the method includes determining a plurality of distance-normalized wind coherences acting on the wind turbine as a function of the covariance of each pair of the filtered sensor signals as well as their auto-covariances. Thus, the method also includes estimating an overall wind coherence acting on the wind turbine as a function of the distance-normalized wind coherences.

In one embodiment, the method further includes smoothing the covariance using a fading memory smoothing filter. In another embodiment, the plurality of sensors includes at least one Light Detection and Ranging (LIDAR) sensor. Further, in certain embodiments, the filter(s) may include a band-pass filter.

In additional embodiments, the method may include determining a distance between the sensors that generated the pair of sensor signals. In such embodiments, the method may include normalizing the distance-normalized wind coherence by the distance between the sensors when the distance is less than a predetermined threshold. Alternatively, the method may include amplifying the distance-normalized wind coherence when the distance is greater than a predetermined threshold.

In additional embodiments, the step of determining the covariance of each pair of the sensor signals comprises multiplying each pair of sensor signals together. In another embodiment, the step of estimating the overall wind coherence acting on the wind turbine as a function of the distance-normalized wind coherences further may include averaging the distance-normalized wind coherences.

In yet another embodiment, the method may further include estimating the overall wind coherence acting on the wind turbine in real-time online. In still a further embodiment, the wind conditions near the wind turbine may include wind speeds, wind directions, wind gusts, wind turbulence and/or any other suitable wind conditions.

In another aspect, the present disclosure is directed to a system for controlling a wind turbine. The system includes a plurality of sensors configured to generate a plurality of sensor signals reflective of wind conditions near the wind turbine and a controller communicatively coupled to the plurality of sensors and having at least one processor. The processor is configured to perform one or more operations, including but not limited to filtering, via at least one filter, the sensor signals at a predetermined frequency range considered damaging for turbine loading, determining a covariance of each pair of the filtered sensor signals, determining a plurality of distance-normalized wind coherences acting on the wind turbine as a function of the covariance of each pair of the filtered sensor signals, estimating an overall wind coherence acting on the wind turbine as a function of the distance-normalized wind coherences, and controlling the wind turbine based on the overall wind coherence. It should be understood that the system may further include any of the additional features as described herein.

In yet another aspect, the present disclosure is directed to a method for controlling a wind turbine. The method includes generating, via a plurality of sensors, a plurality of sensor signals reflective of wind conditions near the wind turbine. The method also includes filtering, via at least one filter, the sensor signals at a predetermined frequency range considered damaging for turbine loading. Further, the method includes determining a covariance of each pair of the filtered sensor signals. In addition, the method includes determining a plurality of distance-normalized wind coherences acting on the wind turbine as a function of the covariance of each pair of the filtered sensor signals. The method further includes estimating an overall wind coherence acting on the wind turbine as a function of the distance-normalized wind coherences. Thus, the method also includes controlling the wind turbine based on the overall wind coherence. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
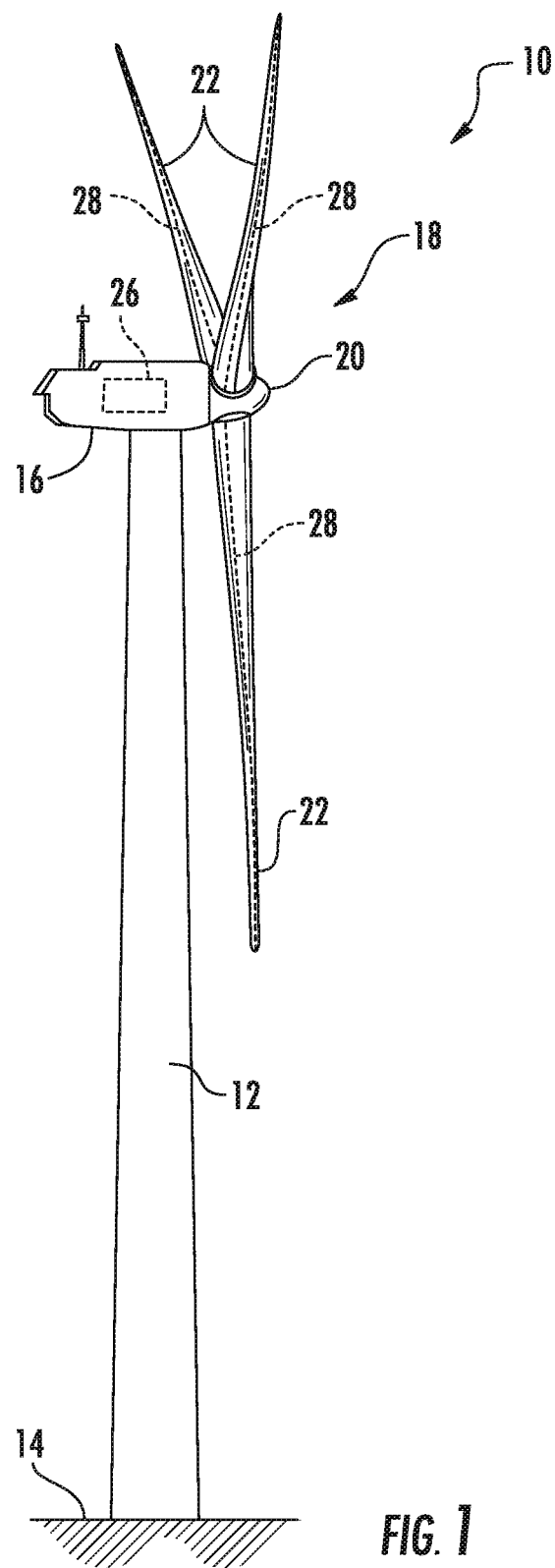
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for estimating an overall wind coherence (i.e. rotor-average loads-relevant wind coherence) acting on a wind turbine and controlling the wind turbine based on said overall wind coherence. The method includes generating, via a plurality of sensors, a plurality of sensor signals reflective of wind conditions near the wind turbine and filtering the sensor signals at a predetermined frequency range considered damaging for turbine loading, e.g. using one or more band-pass filters. Further, the method includes determining a covariance of each pair of the filtered sensor signals. Moreover, the method includes determining a plurality of distance-normalized wind coherences acting on the wind turbine as a function of the covariance of each pair of the filtered sensor signals. Thus, the method also includes estimating an overall wind coherence acting on the wind turbine as a function of the distance-normalized wind coherences and controlling the wind turbine based on said overall wind coherence.

The present disclosure provides many advantages not present in the prior art. For example, conventional wind turbines using LIDAR sensors are required to have a different strategy for normal turbulent wind versus extreme wind to solve the trade-off between increased fatigue during normal turbulence and increased extreme loads during coherent gusts. Such trade-offs arise due to different requirements on the signal-to-noise ratio and estimation bandwidth between the two wind scenarios. In contrast, the present disclosure provides a real-time online estimation of coherence and uses the estimation in the modification of the control algorithm. As such, the present disclosure uses an overall wind coherence estimation and pair-wise variance (which provides the size of the coherent structures) for adaptively changing the bandwidth of the wind measurement filter or the controller gain. Thus, the present disclosure allows the wind turbine controller to anticipate the coherency of a wind gust, respond to it in full measure, and reduce the extreme loads of the wind turbine.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
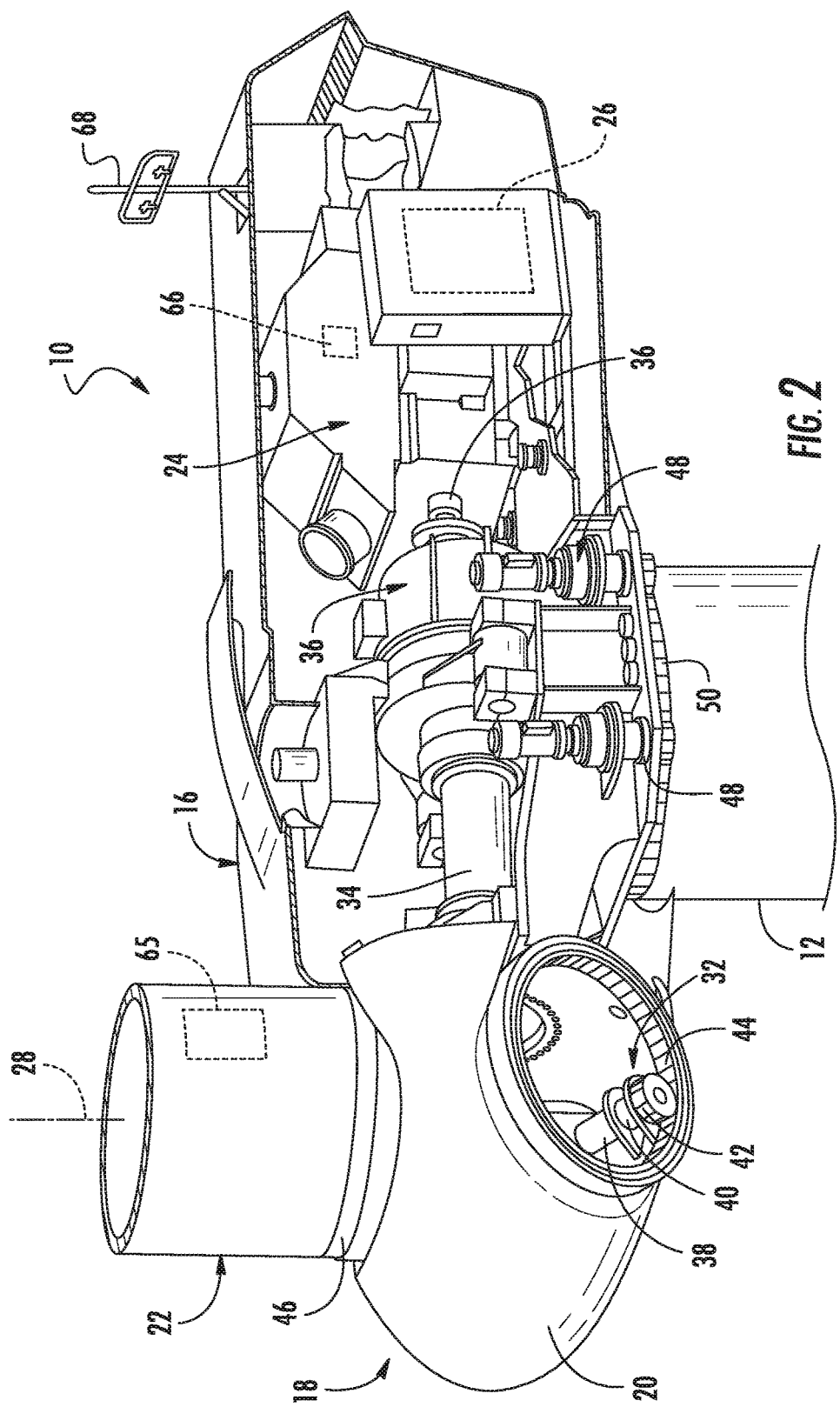
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 48 communicatively coupled to the controller 26, with each yaw drive mechanism(s) 48 being configured to change the angle of the nacelle 16 relative to the wind (e.g., by engaging a yaw bearing 50 of the wind turbine 10).

Still referring to FIG. 2, the wind turbine 10 may also include one or more sensors 65, 66, 68 for measuring operating and/or wind conditions of the wind turbine 10. For example, the sensors may include blade sensors 65 for measuring a pitch angle of one of the rotor blades 22 or for measuring a loading acting on one of the rotor blades 22; generator sensors 66 for monitoring the generator (e.g. torque, rotational speed, acceleration and/or the power output); and/or various wind sensors 68 for measuring various wind parameters (e.g. wind speed, wind direction, etc.). Further, the sensors 65, 66, 68 may be located near the ground of the wind turbine 10, on the nacelle 16, on a meteorological mast of the wind turbine 10, or any other location in the wind farm.

It should also be understood that any other number or type of sensors may be employed and at any location. For example, the sensors may be Light Detecting and Ranging (LIDAR) sensors, Sonic Detection and Ranging (SODAR) sensors, accelerometers, pressure sensors, strain gauges, angle of attack sensors, vibration sensors, MIMU sensors, camera systems, fiber optic systems, anemometers, wind vanes, infra lasers, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 65, 66, 68 may, for example, be used to generate signals relating to the parameter being monitored, which can then be utilized by the controller 26 to determine the actual condition.

Referring back to FIG. 1, the wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 3:
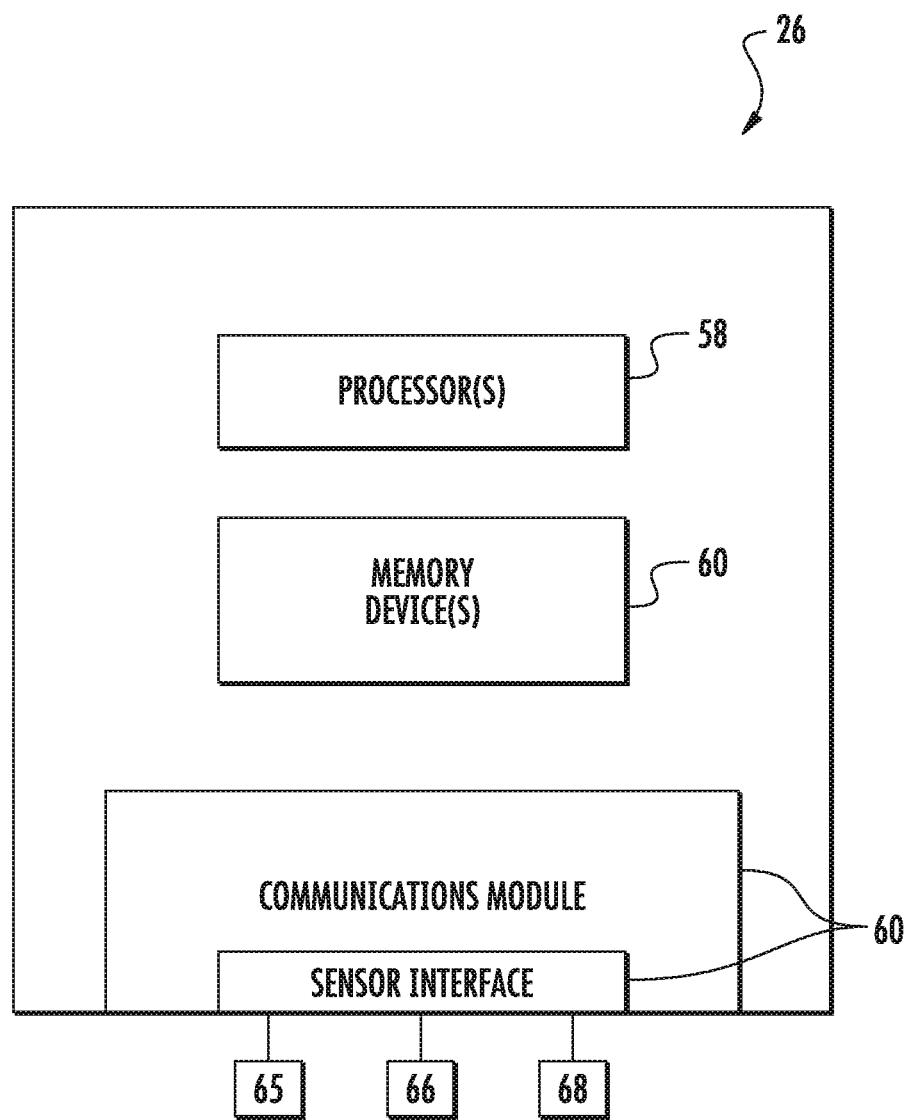
FIG. 3 illustrates a schematic view of one embodiment of a controller of a wind turbine according to the present disclosure.

Referring now to FIG. 3, a block diagram of one embodiment of suitable components that may be included within the controller 26 is illustrated in accordance with aspects of the present disclosure. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 68 to be converted into signals that can be understood and processed by the controller 26. Furthermore, it should be appreciated that the sensors 65, 66, 68 may be communicatively coupled to the communications module 62 using any suitable means. For example, as shown in FIG. 3, the sensors 65, 66, 68 are coupled to the sensor interface 64 via a wired connection. However, in alternative embodiments, the sensors 65, 66, 68 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals from the sensors 65, 66, 68.

Figure 4:
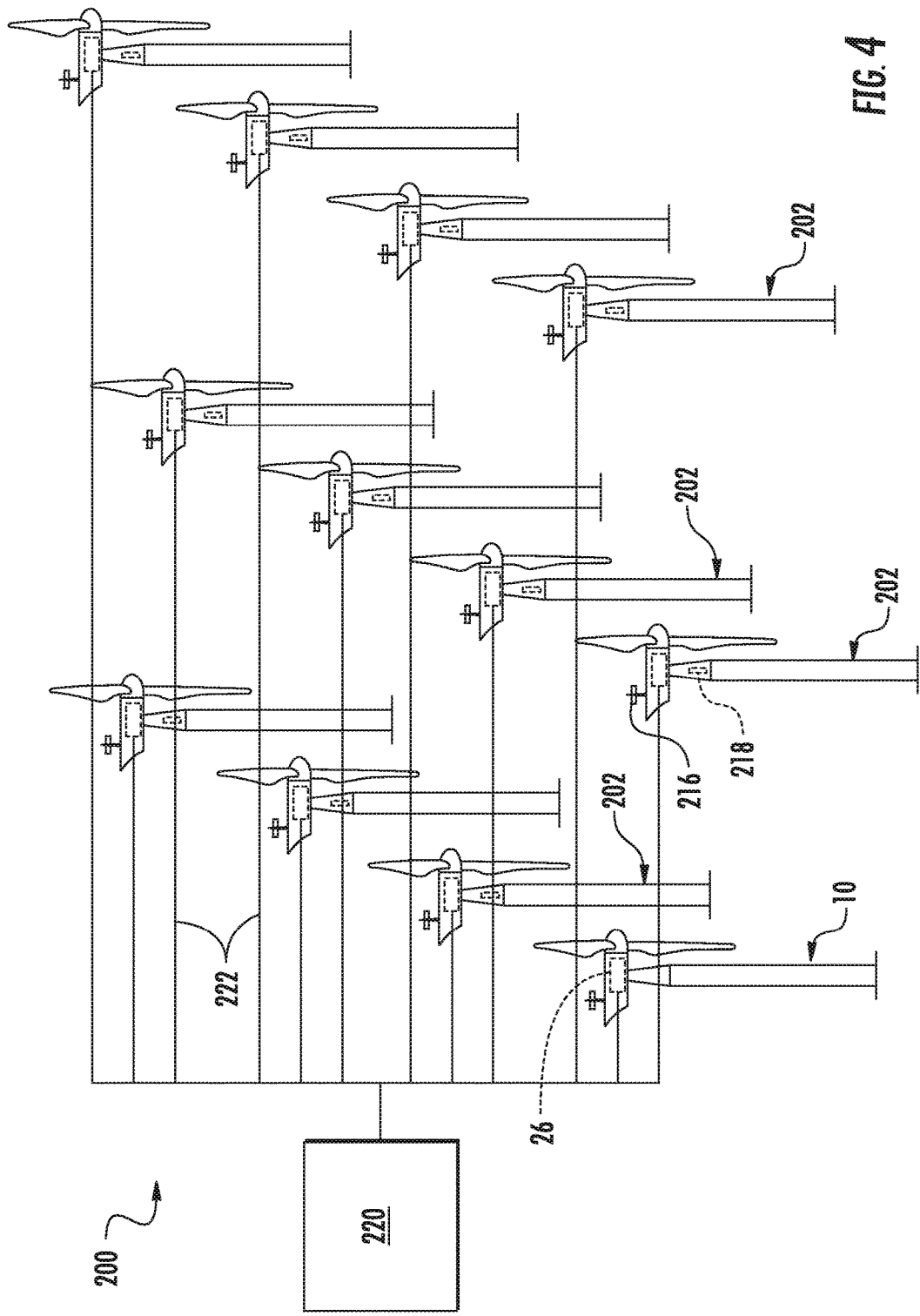
FIG. 4 illustrates a schematic view of one embodiment of a wind farm according to the present disclosure.

Referring now to FIG. 4, a wind farm 200 that is controlled according to the system and method of the present disclosure is illustrated. As shown, the wind farm 200 may include a plurality of wind turbines 202, including the wind turbine 10 described above, and a farm controller 220. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of the wind turbine 10 may be communicatively coupled to the farm controller 220 through a wired connection, such as by connecting the controller 26 through suitable communicative links 222 (e.g., a suitable cable). Alternatively, the controller 26 may be communicatively coupled to the farm controller 220 through a wireless connection, such as by using any suitable wireless communications protocol known in the art. In addition, the farm controller 220 may be generally configured similar to the controllers 26 for each of the individual wind turbines 202 within the wind farm 200.

In several embodiments, one or more of the wind turbines 202 in the wind farm 200 may include a plurality of sensors for monitoring various operational data of the individual wind turbines 202 and/or one or more wind parameters of the wind farm 200. For example, as shown, each of the wind turbines 202 includes a wind sensor 216, such as an anemometer or any other suitable device, configured for measuring wind speeds or any other wind parameter. For example, in one embodiment, the wind parameters include information regarding at least one of or a combination of the following: a wind gust, a wind speed, a wind direction, a wind acceleration, a wind turbulence, a wind shear, a wind veer, a wake, SCADA information, or similar.

Figure 5:
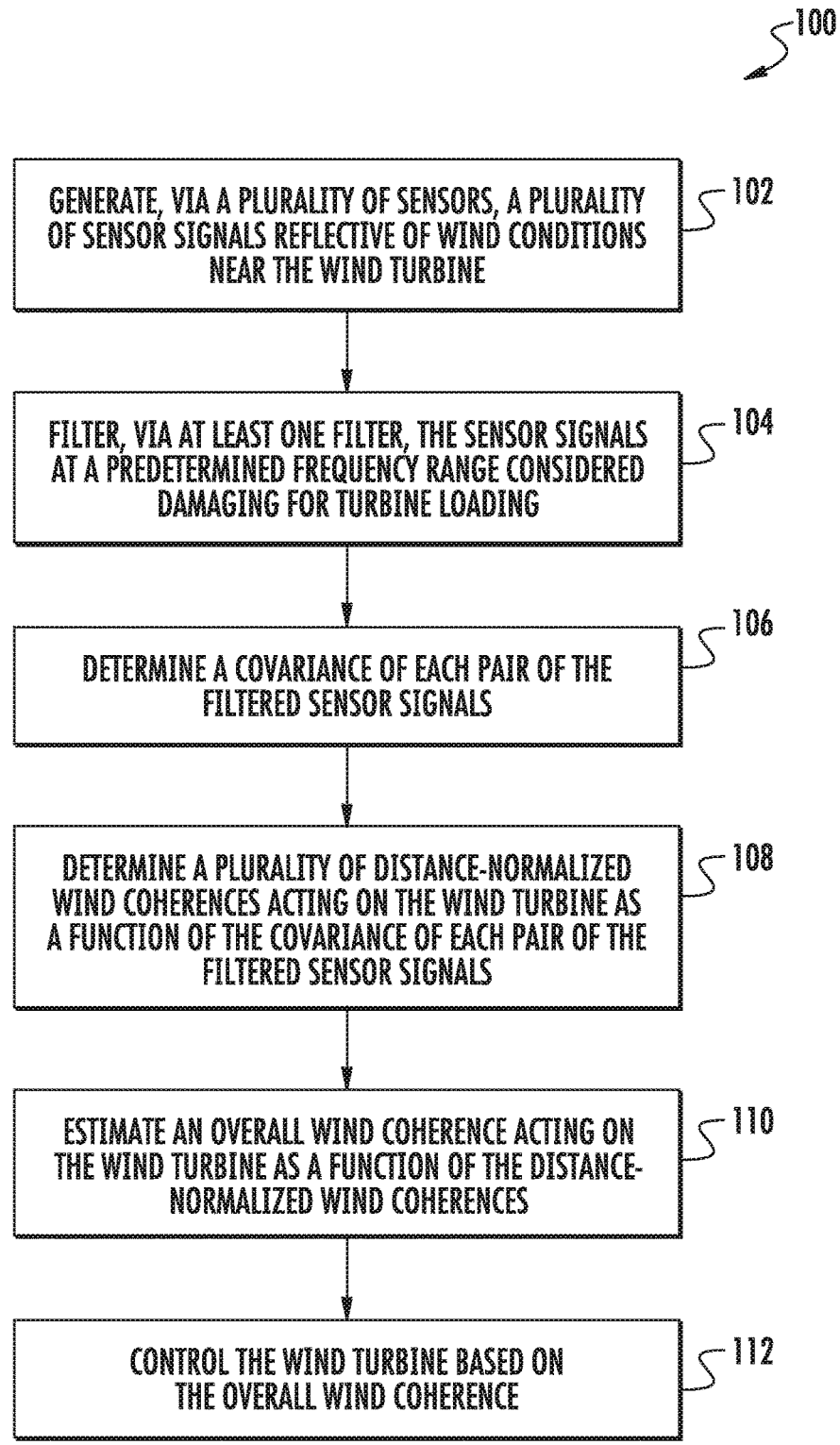
FIG. 5 illustrates a flow diagram of one embodiment of a method for estimating an overall wind coherence acting on a wind turbine according to the present disclosure.

Referring now to FIG. 5, a flow diagram one embodiment of a method 100 for estimating an overall or rotor-wide loads-relevant wind coherence acting on a wind turbine, e.g. the wind turbine 10 of FIG. 1 is illustrated. As shown at 102, the method 100 includes generating a plurality of sensor signals reflective of wind conditions near the wind turbine 10, e.g. using sensors 65, 66, 68. More specifically, as mentioned, the plurality of sensors 65, 66, 68 may include at least one Light Detection and Ranging (LIDAR) sensor. In addition, the wind condition(s) described herein may include may include wind speeds, wind directions, wind gusts, wind turbulence and/or any other suitable wind conditions.

As shown at 104, the method 100 includes filtering, via at least one filter, the sensor signals at a predetermined frequency range considered damaging for turbine loading. The frequency range can vary from turbine to turbine and is generally based on tower frequency, inertia, etc. Further, in certain embodiments, the filter(s) may include a band-pass filter or a shaping filter. As used herein, a band-pass filter generally refers to a device that passes frequencies within a certain range and rejects, i.e. attenuates, frequencies outside of that range. As such, in certain embodiments, the method 100 may include band-pass filtering the sensor signals or measurements for the predetermined frequency range considered damaging for a combination of loads (e.g. speed control, tower loads, etc.).

Still referring to FIG. 5, as shown at 106, the method 100 also includes determining a covariance of each pair of the filtered sensor signals. As used herein, the term "covariance" generally refers to a measure of how much two random variables change together. As such, in certain embodiments, the step of determining the covariance of each pair of the filtered sensor signals may include multiplying each of the pairs of sensor signals together, i.e. pair-wise multiplication of two LIDAR measurements.

In further embodiments, the method 100 may also include smoothing the covariance of each pair of the filtered sensor signals using a simple digital-noise filter, e.g. such as a fading memory smoothing filter. In another embodiment, the method 100 may include determining a moving average for each pair of sensor signals. As used herein, the term "moving average" generally refers to a calculation to analyze data points by creating a series of averages of different subsets of the full data set. More specifically, in certain embodiments, the method 100 may include determining an exponential weighted moving average (EWMA) or a first order low pass filter with a bandwidth of approximately 0.1 Hertz (Hz) for each covariance.

As shown at 108, the method 100 includes determining a plurality of distance-normalized wind coherences acting on the wind turbine 10 as a function of the covariance of each pair of the filtered sensor signals and/or adjusting the distance-normalized wind coherence for pair-wise separation. For example, in certain embodiments, the method 100 may include determining a distance between the pair-wise sensors that generated the pair of sensor signals. In such embodiments, the method 100 may include normalizing the distance-normalized wind coherence by the distance between the sensors when the distance is less than a predetermined threshold. Alternatively, the method 100 may include amplifying the distance-normalized wind coherence when the distance is greater than a predetermined threshold.

As shown at 110, the method 100 includes estimating an overall or rotor-wide wind coherence acting on the wind turbine 10 as a function of the distance-normalized wind coherences. More specifically, in such embodiments, the step of estimating the overall wind coherence acting on the wind turbine 10 as a function of the distance-normalized wind coherences may include averaging the distance-normalized wind coherences. In another embodiment, the method 100 may further include estimating the overall wind coherence acting on the wind turbine in real-time online.

Thus, as shown at 112, the method 100 may also include controlling the wind turbine 10 based on the overall wind coherence. As such, the overall or rotor-wide coherence provides an estimate of how gusty the wind is and can be used to adaptively change the estimation bandwidth or the controller gain or response. More specifically, in certain embodiments, the processor 58 is configured to filter out noise during normal turbulence (thereby reducing fatigue loads) but can also smooth out the wind gusts less during real coherent gusts (thereby reducing extreme loads by responding to the wind gusts in full measure). Without the overall wind coherence estimation, the processor 58 must work identically for both extreme and fatigue loads resulting in a compromise for each.

In additional embodiments, the overall wind coherence can also be used by the controller 26 to control the wind turbine 10. More specifically, in certain embodiments, the processor(s) 58 may be configured to implement a control action based on the overall wind coherence. Such control action(s) may include any suitable control actions so as to reduce loads (e.g. extreme and/or fatigue loads) acting on the wind turbine 10. For example, in several embodiments, the control action may include temporarily de-rating or up-rating the wind turbine 10 to permit the loads acting on one or more of the wind turbine 10 components to be reduced or otherwise controlled. Up-rating the wind turbine 10, such as by up-rating torque, may temporarily slow down the wind turbine 10 and act as a brake to help reduce loads. De-rating the wind turbine 10 may include speed de-rating, torque de-rating or a combination of both. Further, the wind turbine 10 may be de-rated by reducing speed and increasing torque, which can be beneficial so as to maintain power. In another embodiment, the wind turbine 10 may be de-rated by pitching one or more of the rotor blades 22 about its pitch axis 28. More specifically, the controller 26 may generally control each pitch adjustment mechanism 32 in order to alter the pitch angle of each rotor blade 22 between a power position of the rotor blade 22 and a feathered position of the rotor blade 22. In another embodiment, the gain of the controller 26 relating wind estimate with pitch movement is adapted based on load-relevant coherence or co-variance. In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24.

The wind turbine 10 may also be temporarily de-rated by yawing the nacelle 16 to change the angle of the nacelle 16 relative to the direction of the wind. In other embodiments, the controller 26 may be configured to actuate one or more mechanical brake(s) or activate an airflow modifying element on a rotor blade in order to reduce the rotational speed and/or load of the rotor blades 22, thereby reducing loading acting on the wind turbine 10. In still further embodiments, the controller 26 may be configured to perform any appropriate control action known in the art. Further, the controller 26 may implement a combination of two or more control actions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for estimating an overall wind coherence acting on a wind turbine, the method comprising:
   generating, via a plurality of sensors, a plurality of sensor signals reflective of wind conditions near the wind turbine;
   filtering, via at least one filter, the sensor signals at a predetermined frequency range considered damaging for turbine subsystem loading;
   determining a loads-relevant covariance of each pair of the filtered sensor signals, the covariance corresponding to a measure of how much each pair of the filtered sensor signals change together;
   determining a plurality of distance-normalized wind coherences acting on the wind turbine as a function of the covariance of each pair of the filtered sensor signals; and,
   estimating the overall wind coherence acting on the wind turbine as a function of the distance-normalized wind coherences.

2. The method of claim 1, further comprising smoothing the covariance using a fading memory smoothing filter.

3. The method of claim 1, wherein the plurality of sensors comprise at least one Light Detection and Ranging (LIDAR) sensor.

4. The method of claim 1, wherein the at least one filter comprises a band-pass filter.

5. The method of claim 1, further comprising determining a distance between the sensors that generated the pair of sensor signals.

6. The method of claim 5, further comprising normalizing the distance-normalized wind coherence by the distance between the sensors when the distance is less than a predetermined threshold.

7. The method of claim 5, further comprising amplifying the distance-normalized wind coherence when the distance is greater than a predetermined threshold.

8. The method of claim 1, wherein determining the covariance of each pair of the sensor signals comprises multiplying each pair of sensor signals together.

9. The method of claim 1, wherein estimating the overall wind coherence acting on the wind turbine as a function of the distance-normalized wind coherences further comprises averaging the distance-normalized wind coherences.

10. The method of claim 1, further comprising estimating the overall wind coherence acting on the wind turbine in real-time online.

11. The method of claim 1, wherein the wind conditions near the wind turbine comprise at least one of wind speeds, wind directions, wind gusts, wind turbulence.

12. A system for controlling a wind turbine, the system comprising:
- a plurality of sensors configured to generate a plurality of sensor signals reflective of wind conditions near the wind turbine; and,
- a controller communicatively coupled to the plurality of sensors and comprising at least one processor, the processor configured to perform one or more operations, the one or more operations comprising:
  - filtering, via at least one filter, the sensor signals at a predetermined frequency range considered damaging for turbine loading;
  - determining a covariance of each pair of the filtered sensor signals, the covariance corresponding to a measure of how much each pair of the filtered sensor signals change together;
  - determining a plurality of distance-normalized wind coherences acting on the wind turbine as a function of the covariance of each pair of the filtered sensor signals;
  - estimating an overall wind coherence acting on the wind turbine as a function of the distance-normalized wind coherences; and,
  - controlling the wind turbine based on the overall wind coherence.

13. A method for controlling a wind turbine, the method comprising:
- generating, via a plurality of sensors, a plurality of sensor signals reflective of wind conditions near the wind turbine;
- filtering, via at least one filter, the sensor signals at a predetermined frequency range considered damaging for turbine loading;
- determining a covariance of each pair of the filtered sensor signals, the covariance corresponding to a measure of how much each pair of the filtered sensor signals change together;
- determining a plurality of distance-normalized wind coherences acting on the wind turbine as a function of the covariance of each pair of the filtered sensor signals; and,
- estimating an overall wind coherence acting on the wind turbine as a function of the distance-normalized wind coherences; and,
- controlling the wind turbine based on the overall wind coherence.

14. The method of claim 13, further comprising smoothing the covariance using a fading memory smoothing filter.

15. The method of claim 13, wherein the plurality of sensors comprise at least one Light Detection and Ranging (LIDAR) sensor.

16. The method of claim 13, further comprising:
- determining a distance between the sensors that generated the pair of sensor signals;
- normalizing the distance-normalized wind coherence by the distance between the sensors when the distance is less than a predetermined threshold; and,
- amplifying the distance-normalized wind coherence when the distance is greater than a predetermined threshold.

17. The method of claim 14, wherein determining the covariance of each pair of the sensor signals comprises multiplying each pair of sensor signals together.

18. The method of claim 14, wherein estimating the overall wind coherence acting on the wind turbine as a function of the distance-normalized wind coherences further comprises averaging the distance-normalized wind coherences.

19. The method of claim 14, further comprising estimating the overall wind coherence acting on the wind turbine in real-time online so as to prevent damage to the wind turbine.

20. The method of claim 14, wherein the wind conditions near the wind turbine comprise at least one of wind speeds, wind directions, wind gusts, wind turbulence.

* * * * *